United States Patent [19]

Gaylord

[11] E Re. 31,406

[45] Reissued Oct. 4, 1983

[54] OXYGEN PERMEABLE CONTACT LENS COMPOSITION, METHODS AND ARTICLE OF MANUFACTURE

[75] Inventor: Norman G. Gaylord, New Providence, N.J.

[73] Assignee: Syntex (U.S.A.) Inc., Palo Alto, Calif.

[21] Appl. No.: 215,486

[22] Filed: Dec. 11, 1980

Related U.S. Patent Documents

Reissue of:

[64] Patent No.: 3,808,178
Issued: Apr. 30, 1974
Appl. No.: 263,541
Filed: Jun. 16, 1972

U.S. Applications:

[63] Continuation of Ser. No. 931,355, Aug. 7, 1978, abandoned.

[51] Int. Cl.[3] ..... C08F 230/08; G02C 7/04

[52] U.S. Cl. ..... 526/279; 204/165; 264/1.1; 264/2.7; 351/160 H; 351/160 R; 556/444

[58] Field of Search ..... 526/279; 351/160 R, 351/160 H; 204/165

[56] References Cited

U.S. PATENT DOCUMENTS

| | | | |
|---|---|---|---|
| 2,922,807 | 1/1960 | Merker | 260/448.2 |
| 2,956,044 | 10/1960 | Merker | 260/46.5 |
| 3,203,919 | 8/1965 | Brachman | 260/29.6 |
| 3,228,741 | 1/1966 | Becker | 351/160 |
| 3,431,046 | 3/1969 | Conrad et al. | 351/160 |
| 3,661,735 | 5/1972 | Drelich | 204/165 |

OTHER PUBLICATIONS

Physicians' Desk Reference, p. 575 (1969).

Bull. Acad. Sci. USSR, Chem., No. 4, pp. 467–472 (1957).

R. L. Merker et al., Journal of Org. Chem., 21, pp. 1537–1539 (1956).

R. L. Merker et al., Journal of Pol. Sci., 25, Issue No. 108, pp. 115–117 (1957).

*Primary Examiner*—Stanford M. Levin

*Attorney, Agent, or Firm*—Joseph I. Hirsch; Howard M. Peters; Alan M. Krubiner

[57] ABSTRACT

Contact lenses are fabricated from a copolymer of a polysiloxanylalkyl acrylic ester and an alkyl acrylic ester. The copolymer has increased oxygen permeability.

18 Claims, No Drawings

OXYGEN PERMEABLE CONTACT LENS COMPOSITION, METHODS AND ARTICLE OF MANUFACTURE

Matter enclosed in heavy brackets [ ] appears in the original patent but forms no part of this reissue specification; matter printed in italics indicates the additions made by reissue.

*This is a continuation of application Ser. No. 931,355, abandoned, filed Aug. 7, 1978 which was a reissue application of Ser. No. 263,541, filed June 16, 1972, now U.S. Pat. No. 3,808,178.*

This invention relates to novel copolymer compositions.

In another aspect, the invention relates to methods for increasing the oxygen permeability of polymerized acrylates and methacrylates.

In still another respect, the invention concerns contact lenses having increased oxygen permeability.

In yet another respect, the invention relates to wettable contact lens materials.

In a further aspect, the invention concerns oxygen-permeable, wettable transparent copolymers which can be cast, molded or machined to provide improved contact lenses.

The prior art teaches the use of many different polymeric materials in contact lenses. However, although these polymers possess the optical clarity necessary for corrective lenses, they suffer from other characteristics which reduce their potential utility.

Polymethylmethacrylate is rigid and durable but relatively impermeable to oxygen. The hydrogel materials based on hydrophilic polymers such as polyhydroxyethylmethacrylate are soft and have poor durability. In addition, they provide an environment which is favorable for bacterial growth and are also relatively impermeable to oxygen.

Silicone rubber is soft and resilient and is highly permeable to oxygen. However, due to the low strength of polysiloxanes, a filler which increases the refractive index of the mixture, must be added to improve the durability. Further, the precision machining and polishing which is necessary in the fabrication of a corrective contact lens is extremely difficult with the elastomeric silicone rubbers.

Accordingly, it would be highly desirable to provide a polymeric material suitable for use in fabricating contact lenses having increased oxygen permeability, improved mechanical strength, and which is sufficiently rigid to permit precision machining and polishing. I have now discovered novel copolymer materials which possess these properties.

The novel copolymers which I have discovered are prepared by copolymerizing a polysiloxanylalkyl ester of acrylic or methacrylic acid with an alkanol ester of acrylic or methacrylic acid.

The polysiloxanylalkyl ester monomer has the structural formula

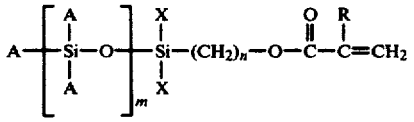

wherein X and Y are selected from the class consisting of $C_1$–$C_5$ alkyl groups, phenyl groups and Z groups; Z is a group of the structure

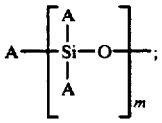

A is selected from the class consisting of $C_1$–$C_5$ alkyl groups and phenyl groups; R is selected from the class consisting of methyl groups and hydrogen; m is an integer from one to five; and n is an integer from one to three.

In the alkanol ester comonomers, the alkyl group contains from 1 to 20 carbon atoms.

Representative polysiloxanylalkyl ester comonomers which may be employed in the practice of the invention include:

pentamethyldisiloxanylmethyl methacrylate,

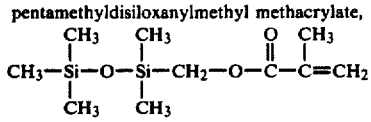

heptamethyltrisiloxanylethyl acrylate,

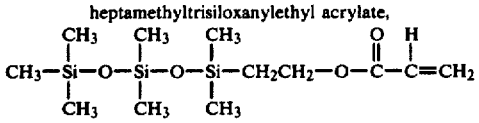

tris(trimethylsiloxy)-γ-methacryloxypropylsilane,

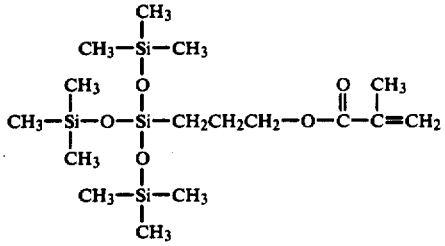

phenyltetramethyldisiloxanylethyl acrylate,

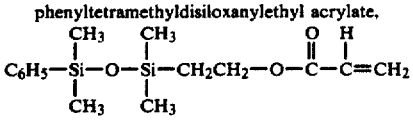

phenyltetraethyldisiloxanylethyl methacrylate,

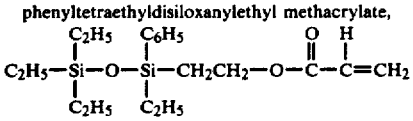

triphenyldimethyldisiloxanylmethyl acrylate,

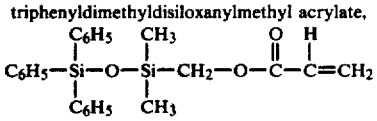

isobutylhexamethyltrisiloxanylmethyl methacrylate,

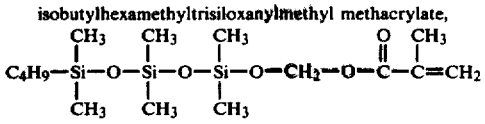

methyldi(trimethylsiloxy)-methacryloxymethylsilane,

-continued

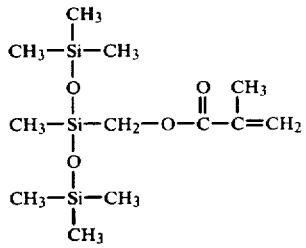

n-propyloctamethyltetrasiloxanylpropyl methacrylate,

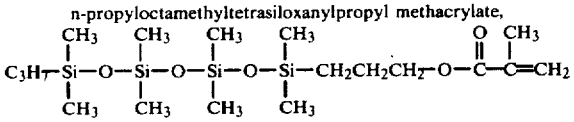

pentamethyldi(trimethylsiloxy)-acryloxymethylsilane,

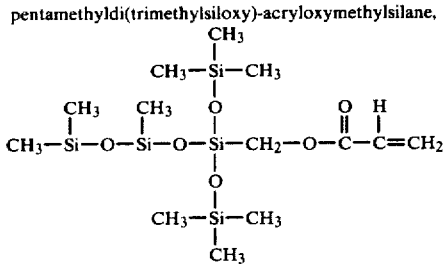

t-butyltetramethyldisiloxanylethyl acrylate,

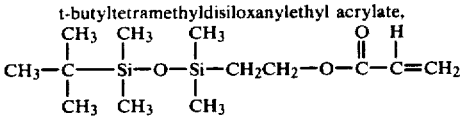

n-pentylhexamethyltrisiloxanylmethyl methacrylate,

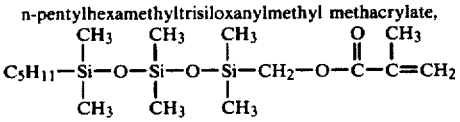

tri-i-propyltetramethyltrisiloxanylethyl acrylate,

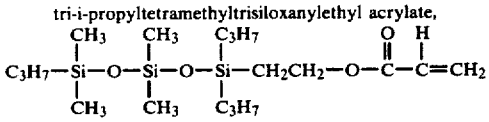

Representative alkanol ester comonomers which may be employed in the practice of the invention include:

methyl acrylate and methacrylate
ethyl acrylate and methacrylate
propyl acrylate and methacrylate
isopropyl acrylate and methacrylate
butyl acrylate and methacrylate
amyl acrylate and methacrylate
hexyl acrylate and methacrylate
heptyl acrylate and methacrylate
octyl acrylate and methacrylate
2-ethylhexyl acrylate and methacrylate
nonyl acrylate and methacrylate
decyl acrylate and methacrylate
undecyl acrylate and methacrylate
lauryl acrylate and methacrylate
cetyl acrylate and methacrylate
octadecyl acrylate and methacrylate The novel copolymers of the present invention comprise about 10–60 parts by weight of one or more of the polysiloxanylalkyl ester monomers copolymerized with about 40–90 parts by weight of one or more of the alkanol ester comonomers.

At present it is preferred to employ polysiloxanyl acrylate and methacrylate esters which have a straight or branched siloxane chain containing two to four silicon atoms having methyl or phenyl substituents and one to three ethylene groups connecting the siloxanyl chain to the acryloxy or methacryloxy group. Best results are obtained if the polysiloxanyl ester content of the comonomer is up to 35% by weight and correspondingly less, e.g., 10–15%, as the silica content of the ester is increased. If one employs a branched chain alkanol ester, e.g., 2-ethylhexyl acrylate, one preferably, employs a lower polysiloxanyl ester comonomer, e.g., pentamethyldisiloxanylmethyl acrylate.

The copolymers of the invention are prepared by contacting the mixture of comonomers with a free radical generating polymerization initiator of the type commonly used in polymerizing ethylenically unsaturated compounds. Representative free radical polymerization initiators include:

acetyl peroxide
lauroyl peroxide
decanoyl peroxide
caprylyl peroxide
benzoyl peroxide
tertiarybutyl peroxypivalate
diisopropyl peroxycarbonate
tertiarybutyl peroctoate
$\alpha,\alpha'$-azobisisobutyronitrile Conventional polymerization techniques can be employed to produce the novel copolymers. The comonomer mixture containing between about 0.05–2% by weight of the free radical initiator is heated to a temperature between 30° C.–100° C., preferably below 70° C., to initiate and complete the polymerization. The polymerization can be carried out directly in a contact lens mold to form a lens generally having the desired configuration. Alternatively, the polymerization mixture can be heated in a suitable mold or container to form discs, rods or sheets which can then be machined to the desired shape using conventional equipment and procedures employed for fabricating lenses from polymethyl methacrylate. The temperature is preferably maintained below 70° C. in order to minimize the formation of bubbles in the copolymer. Instead of employing the bulk polymerization techniques described above, one can employ solution, emulsion or suspension polymerization to prepare the novel copolymers, using techniques conventionally used in the preparation of polymers from ethylenically unsaturated monomers. The copolymer thus produced may be extruded, pressed or molded into rods, sheets or other convenient shapes which are then machined to produce the contact lenses.

The novel copolymers have vastly increased oxygen permeability in comparison to conventional contact lens materials. For example, a copolymer comprising 35 parts pentamethyldisiloxanylmethyl methacrylate and 65 parts of methyl methacrylate has an oxygen permeability of 500 cc.-mil/100 in.$^2$/24 hr./atm. compared to an oxygen permeability of 34 for polymethyl methacrylate and 13 for polyhydroxyethylmethacrylate. These oxygen permeability values were determined in accordance with ASTM D1434, using a tester which has a 3 "Dow" cell pressure change detection units. Discs were cut to proper size to fit the tester, placed in the apparatus and conditioned a minimum of 16 hours under both vacuum and oxygen. Immediately following the conditioning period, the test was performed by plotting a curve of cell pressure versus time. The slope of the curve was then used to calculate the oxygen transmission rate. In general, the oxygen permeability of the copolymers of the invention is at least 4 times to as much as several hundred times higher than that of lenses prepared from polymethylmethacrylate or the so-called "hydrogel" lenses prepared from polyhydroxyethylmethacrylate.

While some of the novel copolymers are inherently wettable by human tears, it may be necessary to improve the wettability of others. This can be accomplished by several alternate methods. For example, wettability can be imparted to the copolymer by the addition of from about 0.1% to about 10% by weight of one or more hydrophilic monomers to the copolymerization mixture. Such monomers include hydroxyalkyl acrylates and methacrylates wherein the alkyl group contains 1 to 4 carbon atoms, acrylic and methacrylic acid, acrylamide, methacrylamide, N-methylolacrylamide, N-methylolmethacrylamide, glycidyl acrylate and methacrylate and N-vinylpyrrolidone. Alternatively, the wettability of the surface of contact lenses made from the novel copolymers can be improved by the application of a wetting agent such as, for example, a dilute aqueous solution of alkyldimethylbenzylammonium chloride, by exposure of the surface to a corona discharge or by chemical treatment of the surface with a strong oxidizing agent such as nitric acid.

The rigidity of the contact lenses prepared from materials useful in the practice of this invention may be varied by changing the ratio of comonomers and/or their chemical composition. Thus, contact lenses prepared from acrylate monomers are more flexible than those prepared from methacrylate monomers. A copolymer of a polysiloxanylalkyl methacrylate and an alkyl methacrylate may be fabricated into a contact lens which is more rigid than a lens prepared from the copolymer of the corresponding acrylates. The lower the alkyl methacrylate content of the copolymer the more flexible the contact lens prepared therefrom.

The rigidity of a contact lens prepared from the materials useful in the practice of this invention may be increased, if desired, by the incorporation into the copolymer composition of 0.01% to about 2% by weight of a crosslinking monomer such as a polyol dimethacrylate or diacrylate or a polyol acrylic ester of higher functionality, for example, ethylene glycol dimethacrylate, butylene glycol dimethacrylate, neopentyl glycol diacrylate and pentaerythritol triacrylate or tetra-acrylate.

The refractive index is an important but noncritical characteristic of a contact lens. Thus, the refractive index of polymethylmethacrylate, the polymer most widely used in the fabrication of contact lenses, is 1.49. The refractive indices of the copolymers useful in the practice of this invention may be varied between 1.35 and 1.50 by varying the ratio and nature of the comonomers. In general, increasing the polysiloxanyl monomer content of the copolymer will decrease its refractive index. The nature of the substituents on the silicon atoms of the polysiloxanyl monomer also importantly affects the refractive index of the copolymer. Lower straight chain alkyl substituents produce copolymers of lower refractive index while polysiloxanyl monomers having phenyl substituents on the silicon atoms yield copolymers having a higher refractive index.

The following examples are presented to illustrate the practice of the invention and not as an indication of the limits of the scope thereof.

EXAMPLE 1

This example illustrates the synthesis of a representative polysiloxanylalkyl ester comonomer, pentamethyldisiloxanylmethyl methacrylate.

Synthesis of dimethylchloromethylchlorosilane

Distilled trimethylchlorosilane (635 ml., 5 moles), B.P. 59.9° C., is placed in a 1-liter, 3-necked, round-bottom flask equipped with a magnetic stirrer, a thermometer, a gas inlet tube and a Dry-Ice cooled reflux condenser whose outlet is connected to a water scrubber. After flushing the apparatus with dry nitrogen for 15 minutes, chlorine gas is introduced through the gas inlet tube and the flask is irradiated by ultraviolet light from a General Electric 15-watt germicidal lamp placed at a distance of 6 in. from the flask. Gaseous hydrogen chloride is evolved and absorbed in the water scrubber which contains a caustic soda solution and a small amount of phenolphthalein. The temperature is maintained in the range 30°–40° C. while chlorine is bubbled through the reaction mixture. After 30 hours of photochlorination, 5 moles of hydrogen chloride is evolved, as indicated by the discharge of the pink color in the water scrubber. The product is distilled through a column with 18 theoretic plates and the fraction distilling at 115° C. is collected. The yield of dimethylchloromethylchlorosilane ($d^{25}=1.07$) is 30%.

Synthesis of pentamethylchloromethyldisiloxane 134 ml. dimethylchloromethylchlorosilane (1 mole) and 127 ml. (1 mole) of trimethylchlorosilane are mixed and shaken thoroughly. When 600 ml. of distilled water is added, exothermic hydrolytic reactions occur immediately. The mixture is shaken on a mechanical shaker overnight to complete hydrolysis. The upper oily layer is separated and is dried over anhydrous sodium carbonate. After drying, the product is distilled through a column of 13 theoretical plates and the fraction which distills at 151°-152° C. is collected. The yield of pentamethylchloromethyldisiloxane (B.P. 151.8° C., $d^{25}=0.910$, $n_D^{20}=1.4106$) is 30%.

Synthesis of pentamethyldisiloxanylmethyl methacrylate 30 ml. pentamethylchloromethyldisiloxane (0.14 mole), 13.8 ml. (0.16 mole) distilled methacrylic acid, 21.0 ml. (0.15 mole) triethylamine, 30 ml. xylene and 0.8 g. hyroquinone are mixed and refluxed for 16 hours. Triethylamine hydrochloride precipitates and is filtered. The filtrate is mixed with 1 g. of hydroquinone and 1 g. of copper powder. Xylene is distilled from the mixture at atmospheric pressure. The distillation apparatus is then connected to a vacuum line and the fraction which distills at 73°–75° C. under 4–5 mm. Hg pressure is collected. The yield of pentamethyldisiloxanylmethyl methacrylate (B.P. 73°–74° C./4 mm. Hg, $d^{20}=0.910$, $n_D^{20}=1.420$) is 45%.

The disiloxane monomer recovered by distillation contains co-distilled hydroquinone. Purification is accomplished by washing the monomer with aqueous alkali solution containing 25% sodium carbonate and 1% sodium hydroxide until the aqueous layer is colorless. The oily monomer layer is then washed with water until neutral and dried over anhydrous sodium carbonate. The dried monomer is refrigerated until used.

EXAMPLE 2

This example illustrates the preparation of a representative oxygen-permeable copolymer.

A mixture of 35 parts of the disiloxane monomer of Example 1, 65 parts of methyl methacrylate and 0.004 ml. of tert-butyl peroxypivalate per ml. of monomer mixture is placed in a polypropylene Petri dish to a height of one-eighth of an inch. The dish is covered and placed in a vacuum oven which has been purged with nitrogen. The oven is closed and the temperature is maintained at 45° C. for 20 hours. The copolymer disc is hard, colorless, transparent and rigid. The oxygen permeability is 500 cc.-mil/100 in.$^2$/24 hr./atm.

The oxygen permeability of a disc of polymethylmethacrylate is 34 cc.-mil/100 in.$^2$/24 hr./atm. while that of a disc of polyhydroxyethylmethacrylate is 13 cc.-mil/100 in.$^2$/24 hr./atm.

A cylindrical plug having dimensions of ¼ inch thickness and ½ inch diameter is prepared by copolymerizing the 35/65 disiloxane monomer/methyl methacrylate mixture in a polyethylene cap at 45° C. for 20 hours. The plug is machined, cut, polished and finished to a concavo-convex lens.

EXAMPLES 3-9

These examples illustrate the preparation and properties of copolymers containing varying proportions of a siloxanyl monomer, methyl methacrylate, and a hydrophilic monomer (hydroxyethyl methacrylate).

Mixtures of the disiloxane monomer of Example 1 (DSM), methyl methacrylate (MMA), hydroxyethyl methacrylate (HEMA) and tert-butyl peroxy pivalate (0.004 ml. per ml. of monomer mixture) is polymerized in polyethylene caps under the conditions shown in the following table:

| | Composition, wt. % | | | Temp. | Time | |
|---|---|---|---|---|---|---|
| Example | DSM | MMA | HEMA | °C. | hr. | Properties* |
| 3 | 20 | 75 | 5 | 50 | 6.5 | T, H, R |
| 4 | 35 | 60 | 5 | 45 | 20 | T, H, R |
| 5 | 44 | 50 | 6 | 50 | 48 | T, H, SR |
| 6 | 45 | 50 | 5 | 45 | 20 | T, H. SR |
| 7 | 45 | 49 | 6 | 70 | 1 | T, H, SR |
| | | | | 50 | 16 | |
| 8 | 51 | 40 | 9 | 75 | 2.5 | T, H. SR |
| 9 | 65 | 30 | 5 | 60 | 4 | NT, S, E |

*T = transparent;
H = hard;
R = Rigid;
SR = Semi-rigid;
NT = hazy;
S = soft;
E = elastomeric The polymerized plugs are machined and finished in the usual manner to lenses with a concave surface on one side and a convex surface on the opposite side. The lenses are easily wetted by water and an aqueous saline solution.

EXAMPLE 10

This example illustrates the preparation and properties of a wettable oxygen-permeable terpolymer.

A disc is prepared in the manner described in Example 2 from a mixture of 45 parts of the disiloxane monomer of Example 1, 50 parts of methyl methacrylate and 5 parts of hydroxyethylmethacrylate using tert-butyl peroxypivalate as catalyst. The polymerization is carried out at 45° C. for 20 hours. The resultant disc is colorless, transparent, hard and semi-rigid. The surface of the disc is readily wetted by water and saline solution. The oxygen permeability of the terpolymer is 765 cc.-mil/100 in.$^2$/24 hr./atm.

EXAMPLE 11

This example illustrates the preparation and properties of a wettable oxygen-permeable terpolymer.

A disc prepared in the same manner described in Example 2 by polymerizing a mixture of 20 parts of the disiloxane monomer of Example 1, 75 parts of methyl methacrylate, 5 parts of hydroxyethyl methacrylate and 0.004 ml. of tert-butyl peroxypivalate per ml. of monomer mixture, at 50° C. has an oxygen permeability of 135 cc.-mil/100 in.$^2$/24 hr./atm. Lenses cut and machined from the disc are transparent, hard and rigid.

EXAMPLES 12-14

These examples illustrate the preparation and properties of copolymers of a siloxanyl monomer with various proportions of other methacrylate ester comonomers.

Cylindrical plugs are prepared in the manner described in Example 3 from mixtures of the disiloxane monomer (DSM) of Example 1, methyl methacrylate (MMA), octadecyl methacrylate (ODMA), hydroxyethyl methacrylate (HEMA) and ethylene glycol dimethacrylate (EGDMA) by polymerization at 70° C. for 2.5 hours using tert-butyl peroxypivalate as catalyst. The properties of lenses prepared from the plugs are shown in the following table:

| Example | Composition, wt. % | | | | | Properties |
|---|---|---|---|---|---|---|
| | DSM | MMA | ODMA | HEMA | EGDMA | |
| 12 | 35 | 30 | 30 | 5 | 0 | T, H, E |
| 13 | 45 | 30 | 20 | 5 | 0 | T, S, E |
| 14 | 45 | 38 | 10 | 5 | 2 | T, S, R |

EXAMPLE 15

This example illustrates the synthesis of 1,1,1-tris(trimethylsiloxy)methacrylatopropylsilane.

23.8 g. (13.0 ml.) of concentrated sulfuric acid is added slowly with stirring to a mixture of 11.6 g. (14.7 ml.) of absolute ethanol and 16.5 ml. of water. The mixture is cooled in a water bath.

Methacrylatopropyltrimethoxysilane (0.1 mole, 24.8 g.), is mixed with 0.3 mole (39.6 g.) of trimethylacetoxysilane in a flask equipped with a magnetic stirrer. Ethylsulfuric acid (6.5 g.), prepared as described above, is added dropwise from a dropping funnel into the stirred mixture. The flask is cooled during the addition of the ethylsulfuric acid catalyst solution in an ice water bath. After completion of the catalyst addition, the solution is stirred at room temperature for two days. The upper oily layer is then separated, washed with sodium bicarbonate solution, washed with water and then dried over anhydrous sodium sulfate. The produce is distilled under vacuum to remove ethyl acetate. The distillation flask is immersed in a water bath whose temperature is maintained at 40°-45° C. to prevent premature polymerization of the monomer. The yield of tris(trimethylsiloxy)methacrylatopropylsilane is 86% and the density of the monomer is 0.989 g./cc. at 20° C. The monomer is refrigerated until used.

EXAMPLE 16

This example illustrates the preparation of a copolymer of methyl methacrylate with the novel polysiloxanyl ester of Example 15.

A cylindrical plug is prepared by polymerizing a mixture of 40 parts of tris(trimethylsiloxy)-α-methacryloxypropylsilane and 60 parts of methyl methacrylate in the presence of tert-butyl peroxypivalate at 50° C. Lenses prepared from the plug are hard, transparent and oxygen permeable.

EXAMPLES 17-28

This example illustrates the preparation of various copolymers of polysiloxanyl esters and various alkyl acrylates or methacrylates. The polysiloxanyl ester comonomers are prepared according to the general techniques of Examples 1 and 15. The copolymer is prepared according to the general technique of Example 2. All copolymers resulting are transparent, hard and rigid so as to be suitable for contact lens manufacture. The oxygen permeability of the copolymers varies from 300-500 cc.-mil/100 in.$^2$/24 hr./atm. as measured by the technique previously described.

| | POLYSILOXANYL ESTER | | ALKANOL ESTER | |
|---|---|---|---|---|
| *Example* | Wt. % in Copolymer | Monomer | Wt. % in Copolymer | Monomer |
| 17 | 35 | heptamethyltrisiloxanylethyl acrylate | 65 | 2-ethylhexyl acrylate |
| 18 | 30 | isobutylhexamethyltrisiloxanylmethyl methacrylate | 70 | t-butyl methacrylate |
| 19 | 30 | n-propyloctamethyltetrasiloxanylpropyl methacrylate | 70 | decyl methacrylate |
| 20 | 25 | tri-i-propyltetramethyltrisiloxanylethyl acrylate | 75 | isopropyl acrylate |
| 21 | 25 | t-butyltetramethyldisiloxanylethyl acrylate | 75 | methyl acrylate |
| 22 | 20 | n-pentylhexamethyltrisiloxanylmethyl methacrylate | 80 | ethyl methacrylate |
| 23 | 20 | phenyltetramethyldisiloxanylethyl acrylate | 80 | octadecyl acrylate |
| 24 | 20 | phenyltetraethyldisiloxanylethyl methacrylate | 80 | hexyl methacrylate |
| 25 | 15 | triphenyldimethylsiloxanylmethyl acrylate | 85 | methyl acrylate |
| 26 | 15 | tris(trimethylsiloxy)-γ-methacryloxypropylsilane | 85 | methyl methacrylate |
| 27 | 15 | methyldi(trimethylsiloxy)-methacryloxymethylsilane | 85 | n-propyl methacrylate |
| 28 | 10 | pentamethyldi(trimethylsiloxy)-acryloxymethylsilane | 90 | ethyl acrylate |

As illustrated by Examples 17-28, it is preferred to use a straight chain alkanol ester monomer if the polysiloxanyl ester monomer is a branched chain compound, and vice versa. Also, it is preferred to employ two acrylate or two methacrylate comonomers to prepare the copolymer, rather than an acrylate monomer and a methacrylate monomer. Finally, where more complex polysiloxanyl ester comonomers are employed, the proportion of polysiloxanyl ester is lower, e.g., 10-20%, than if simpler polysiloxanyl esters are employed. In general, the presence of larger, more complex substituents on the interior silicon atoms tend to increase the refractive index of the copolymer, all other factors being equal.

Having described my invention in such manner as to enable those skilled in the art to understand and practice it and having identified the preferred embodiments thereof, I claim:

[1. A new composition of matter specially adapted for the production of contact lenses having increased oxygen permeability, said new composition being a solid copolymer of comonomers consisting essentially of:

(a) about 10 to 60 parts by weight of a polysiloxanylalkyl ester of the structure]

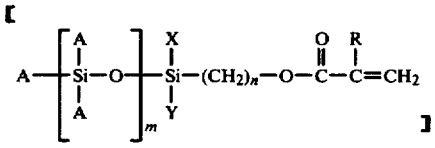

[wherein:

(1) X and Y are selected from the class consisting of $C_1$-$C_5$ alkyl groups, phenyl groups and Z groups, (2) Z is a group of the structure]

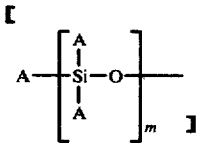

[(3) A is selected from the class consisting of $C_1$-$C_5$ alkyl groups and phenyl groups, (4) R is selected from the class consisting of methyl groups and hydrogen, (5) m is an integer from one to five, and (6) n is an integer from one to three; and (b) about 40 to 90 parts by weight of an ester of a $C_1$-$C_{20}$ monohydric alkanol and an acid selected from the class consisting of acrylic and methacrylic acids.]

2. As a new article of manufacture, a contact lens having increased oxygen permeability *in comparison with poly(methylmethacrylate)*, said lens being fabricated from [the copolymer composition of claim 1,] *a solid copolymer of comonomers consisting essentially of:*

*(a) about 10 to 60 parts by weight of a polysiloxanylalkyl ester of the structure*

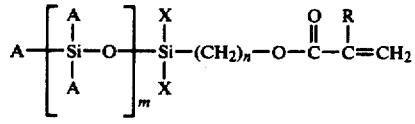

*wherein*

*(1) X and Y are selected from the class consisting of* $C_1$-$C_5$ alkyl groups, phenyl groups and Z groups,

*(2) Z is a group of the structure*

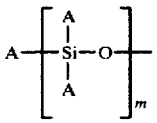

(3) *A is selected from the class consisting of* $C_1$–$C_5$ *alkyl groups and phenyl groups,*

(4) *R is selected from the class consisting of methyl groups and hydrogen,*

(5) *m is an integer from one to five, and*

(6) *n is an integer from one to three; and*

(b) *about 40 to 90 parts by weight of an ester of a* $C_1$–$C_{20}$ *monohydric alkanol and an acid selected from the class consisting of acrylic and methacrylic acids,*

*said lens* having a refractive index of from 1.35 to 1.50.

*3. The contact lens of claim 2 wherein said solid copolymer of comonomers includes as a comonomer a minor amount of a crosslinking monomer.*

*4. The contact lens of claim 3 wherein said cross-linking monomer is a polyol dimethacrylate or a polyol diacrylate.*

*5. The contact lens of claim 3 wherein said cross-linking monomer is present in an amount equal to about 0.01% to about 2% by weight of said copolymer.*

*6. The contact lens of claim 5 wherein said cross-linking monomer is a polyol dimethacrylate or a polyol diacrylate.*

*7. The contact lens of claim 3 wherein said solid copolymer of comonomers includes as a comonomer a minor amount of a wetting monomer.*

*8. The contact lens of claim 7 wherein said wetting monomer is methacrylic acid.*

*9. The contact lens of claim 7 wherein said wetting monomer is present in an amount equal to about 0.1% to about 10% by weight of said copolymer.*

*10. The contact lens of claim 9 wherein said wetting monomer is methacrylic acid.*

*11. The contact lens of claim 2 wherein said solid copolymer of comonomers includes as a comonomer a minor amount of a wetting monomer.*

*12. The contact lens of claim 11 wherein said wetting monomer is methacrylic acid.*

*13. The contact lens of claim 11 wherein said wetting monomer is present in an amount equal to about 0.1% to about 10% by weight of said copolymer.*

*14. The contact lens of claim 13 wherein said wetting monomer is methacrylic acid.*

*15. The contact lens of claims 2 or 3 wherein a wetting agent is applied to the surface of said lens.*

*16. The contact lens of claim 15 wherein said wetting agent is a dilute aqueous solution of an alkyldimethylbenzylammonium chloride.*

*17. The contact lens of claims 2 or 3 wherein the wettability of the surface of said lens is improved by exposure of the surface to a corona discharge.*

*18. The contact lens of claims 2 or 3 wherein the wettability of the surface of said lens is improved by treatment of the surface with a strong oxidizing agent.*

*19. The contact lens of claim 18 wherein said strong oxidizing agent is nitric acid.*

* * * * *

UNITED STATES PATENT AND TRADEMARK OFFICE

CERTIFICATE OF CORRECTION

PATENT NO. : Re. 31,406

DATED : Reissued Oct. 4, 1983

INVENTOR(S) : Norman G. Gaylord

It is certified that error appears in the above-identified patent and that said Letters Patent are hereby corrected as shown below:

Column 1, lines 62-66, the formula reading:

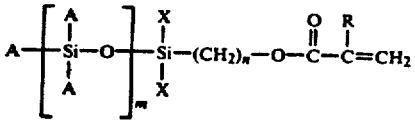

should read:

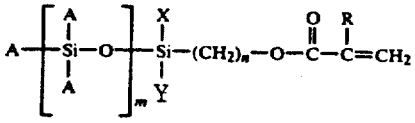

Column 2, lines 51-55, the formula for phenyltetraethyldisiloxanylethyl acrylate reading:

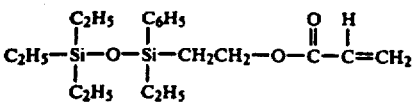

should read:

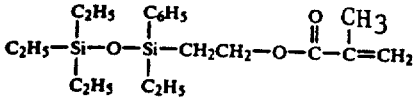

Col. 2 lines 63-67, the formula for isobutylhexamethyltrisiloxanylmethyl methacrylate reading:

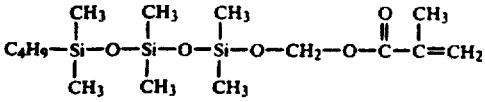

should read:

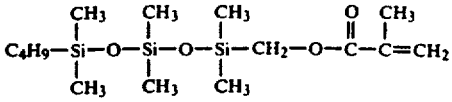

Column 3, lines 12-28, the formula for pentamethyldi(trimethylsiloxy)-acryloxymethylsilane reading:

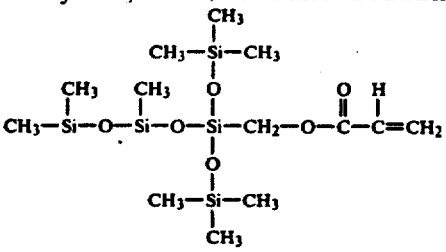

should read:

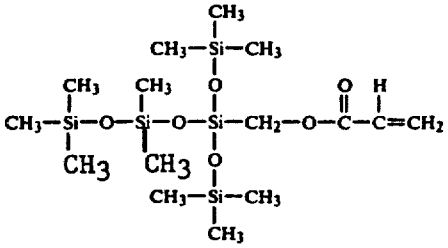

Column 4, line 11, "preferably," should be --preferably--. Lines 25 and 27, "tertiarybutyl" should be --tertiary-butyl--, both occurrences.

Column 6, line 7 "dimethylchloromethylchlorosilane" should be --Dimethylchloromethylchlorosilane--. Lines 9, 42 and 59 "B.P." should be --b.p.--. Line 11, "Dry-Ice" should be --dry-ice--.

UNITED STATES PATENT AND TRADEMARK OFFICE

CERTIFICATE OF CORRECTION

PATENT NO. : Re. 31,406

DATED : Reissued Oct. 4, 1983

INVENTOR(S) : Norman G. Gaylord

It is certified that error appears in the above-identified patent and that said Letters Patent are hereby corrected as shown below:

Line 30, "pentamethylchloromethyldisiloxane" should be --Pentamethylchloromethyldisiloxane--. Lines 45-46, "pentamethyldisiloxanylmethyl methacrylate" should be --Pentamethyldisiloxanylmethyl Methacrylate--.

Column 8, line 61, "produce" should be --product--.

Column 9, line 7, "$\alpha$" should be --$\gamma$--.

Column 10, lines 58-62, the formula in Claim 2 reading:

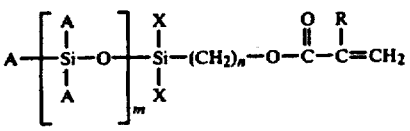

should read:

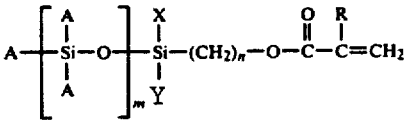

Column 11, line 25 (line 2 of Claim 3), "crosslinking" should read --cross-linking--.

Signed and Sealed this

*Twelfth* Day of *June 1984*

[SEAL]

*Attest:*

GERALD J. MOSSINGHOFF

*Attesting Officer*

*Commissioner of Patents and Trademarks*